(12) United States Patent
Pichetti et al.

(10) Patent No.: US 11,190,537 B2
(45) Date of Patent: Nov. 30, 2021

(54) VULNERABILITY MANAGEMENT OF DISCONNECTED ENDPOINTS

(71) Applicant: International Business Machines Corporation, Armonk, NY (US)

(72) Inventors: Luigi Pichetti, Rome (IT); Paavo Anselmi Parkkinen, Helsinki (FI); Daniel W. Montgomery, Winston Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 16/443,899

(22) Filed: Jun. 18, 2019

(65) Prior Publication Data

US 2020/0404012 A1    Dec. 24, 2020

(51) Int. Cl.
*H04L 29/06*         (2006.01)
*H04L 12/24*         (2006.01)

(52) U.S. Cl.
CPC ........ *H04L 63/1433* (2013.01); *H04L 41/046* (2013.01); *H04L 41/0893* (2013.01); *H04L 41/147* (2013.01); *H04L 63/145* (2013.01)

(58) Field of Classification Search
CPC ... H04L 63/1433; H04L 63/145; H04L 63/20; H04L 41/143; H04L 41/0893; H04L 41/046
See application file for complete search history.

(56) References Cited

U.S. PATENT DOCUMENTS 5,845,077 A * 12/1998 Fawcett .................... G06F 8/65
                                                  709/221
2009/0234872 A1 * 9/2009 Padgett ................. G06F 16/273
(Continued)

FOREIGN PATENT DOCUMENTS

JP    2012043208 A    3/2012
WO    2014130474 A1   8/2014

OTHER PUBLICATIONS

Cui et al., "A Less Resource-Consumed Security Architecture on Cloud Platform", Wuhan University Journal of Natura Sciences, 2016, vol. 21 No. 5, 407-414, Article ID 1007-1202(2016)05-0407-08, DOI 10.1007/s11859-016-1188-z, Received date: Apr. 10, 2016, 2 pages.

(Continued)

*Primary Examiner* — Brian J. Gillis
*Assistant Examiner* — Jsing Forng Lin
(74) *Attorney, Agent, or Firm* — Brian M. Restauro

(57) ABSTRACT

A first latest status of the one or more disconnected endpoints from a memory is retrieved. A set of predicted vulnerabilities for each of the one or more disconnected endpoints from the memory is retrieved. A set of preventive actions and policies associated with the set of predicted vulnerabilities to be performed when each of the one or more disconnected endpoints reconnects to the network is retrieved. The set of preventive actions and policies are retrieved from the memory. A determination is made whether at least one endpoint in the one or more endpoints not connected to the network reconnects to the network. If least one endpoint in the one or more endpoints not connected to the network has reconnected to the network, at least one preventive action from the set of preventive actions and policies on the at least one endpoint reconnected to the network is performed.

20 Claims, 3 Drawing Sheets

(56) References Cited

U.S. PATENT DOCUMENTS

| | | | | |
|---|---|---|---|---|
| 2013/0047263 A1* | 2/2013 | Radhakrishnan | ..... | H04L 63/105 726/27 |
| 2013/0247133 A1* | 9/2013 | Price | ..... | G06F 21/577 726/1 |
| 2014/0237545 A1* | 8/2014 | Mylavarapu | ..... | H04L 63/1433 726/3 |
| 2015/0149624 A1* | 5/2015 | Hindawi | ..... | H04L 41/0893 709/224 |
| 2015/0319251 A1* | 11/2015 | Kim | ..... | H04L 67/1097 709/223 |
| 2016/0117692 A1* | 4/2016 | Nasir | ..... | H04L 12/2801 705/7.29 |
| 2017/0126693 A1* | 5/2017 | Votaw | ..... | H04W 12/37 |
| 2017/0264644 A1* | 9/2017 | Mihan | ..... | H04W 4/70 |

OTHER PUBLICATIONS

Kao, I-Lung "Closing the Vulnerability Management Gap with BigFix and QVM", Bigfix, IBM, Jan. 26, 2017, 2 pages.

"IBM BigFix Intergration", 3 pages, <https://www.ibm.com/support/knowledgecenter/SS42VS_7.3.0/com.IBM.qradar.doc/c_qvm_iem_integr.html>.

* cited by examiner

VULNERABILITY MANAGEMENT OF DISCONNECTED ENDPOINTS

BACKGROUND

The present invention relates generally to the field of software management, and more particularly to providing predictive vulnerability management of disconnected endpoints in enterprise systems.

Enterprises systems (ES) are large-scale application software packages that support business processes, information flows, reporting, and data analytics within complex organizations such as large commercial businesses, financial institutions, and government agencies. An ES includes a central database on an endpoint management server (EMS) connected to a plurality of endpoints. Each endpoint can be a physical computer, or a virtualization of a computer, that includes one or more applications used by the ES and an endpoint management agent (EMA). The EMA collects information about the endpoint and carries out actions instructed by the EMS. Each endpoint is intermittently connected to the EMS and disconnected from the EMS.

SUMMARY OF THE INVENTION

Embodiments of the present invention include an approach for providing predictive vulnerability management of disconnected endpoints in enterprise systems. In one embodiment, in response to determining that one or more endpoints in a plurality of endpoints is not connected to a network, a first latest status of the one or more disconnected endpoints from a memory is retrieved. A set of predicted vulnerabilities for each of the one or more disconnected endpoints from the memory is retrieved. A set of preventive actions and policies associated with the set of predicted vulnerabilities to be performed when each of the one or more disconnected endpoints reconnects to the network is retrieved. The set of preventive actions and policies are retrieved from the memory. A determination is made whether at least one endpoint in the one or more endpoints not connected to the network reconnects to the network. In response to determining that at least one endpoint in the one or more endpoints not connected to the network has reconnected to the network, at least one preventive action from the set of preventive actions and policies on the at least one endpoint reconnected to the network is performed.

DETAILED DESCRIPTION

Embodiments of the present invention enable providing predictive vulnerability management of disconnected endpoints in enterprise systems. When an endpoint is connected to an endpoint management server (EMS), the endpoint can receive, in a timely manner, any communications from the EMS. These communications can include, but are not limited to, routine instructions and critical software updates. When an endpoint is not connected to the EMS, the endpoint is not able to receive those communications. Thus, when the endpoint is reconnected to the EMS, it is vulnerable, until such time the endpoint receives the updates from the EMS, because while disconnected the endpoint has not received the needed updates.

Embodiments of the present invention recognize that there may be a method, computer program product, and computer system for providing predictive vulnerability management of disconnected endpoints in enterprise systems. In an embodiment, when an endpoint is disconnected from the EMS, a list of predicted vulnerabilities can be generated and actions to be taken on the disconnected endpoint can be identified from the predicted vulnerabilities. When the endpoint is reconnected to the EMS, the actions can be immediately taken to protect the endpoint from the predicted vulnerabilities.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
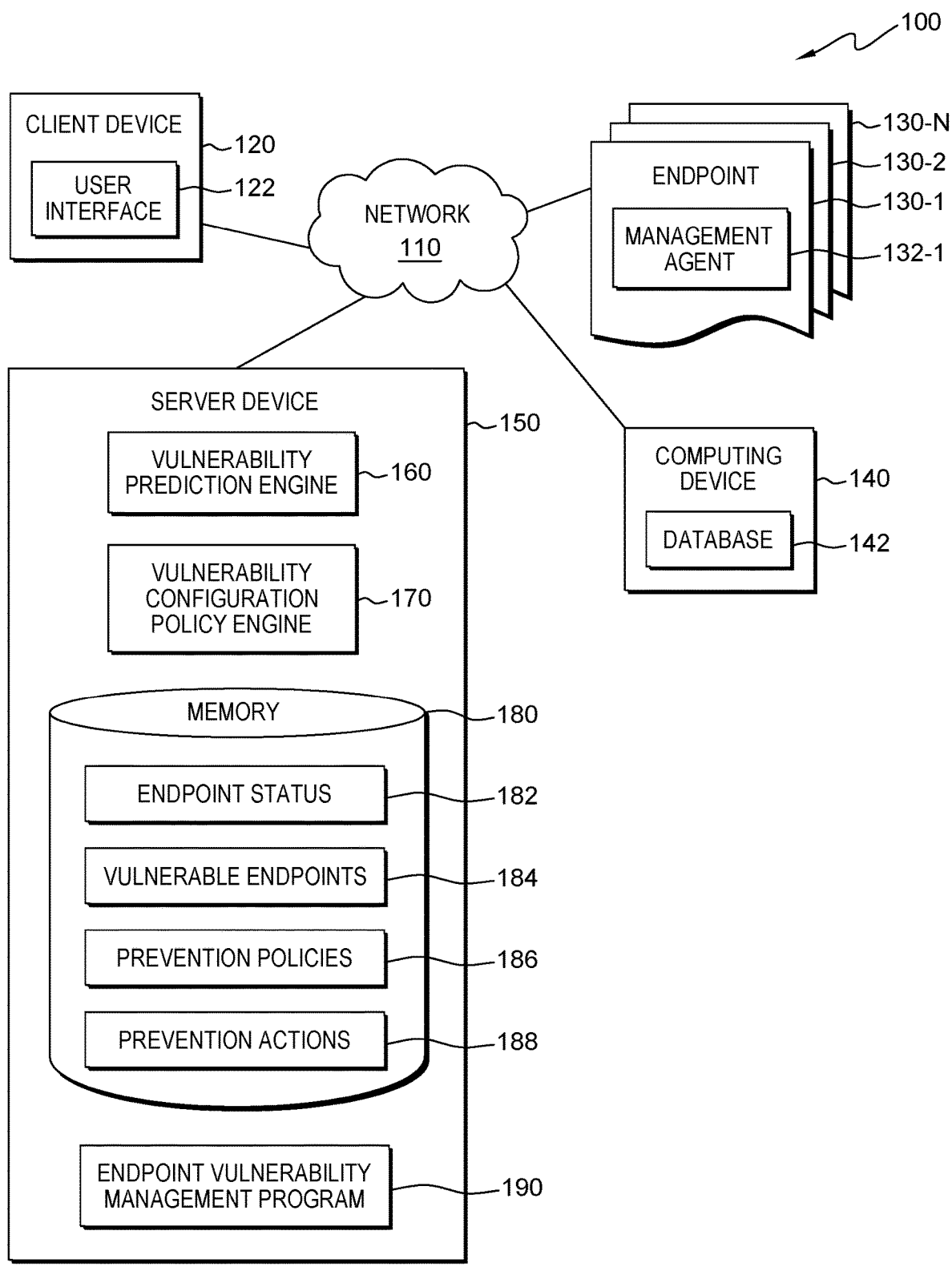
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120, a plurality of endpoint 130-N, computing device 140, and server device 150, interconnected by network 110. In this paper, discussion concerning endpoint 130-N is applicable for all the plurality of endpoints 130-N (i.e., 130-1, 130-2, etc.). In example embodiments, computing environment 100 includes other computing devices (not shown in FIG. 1) such as smartwatches, cell phones, smartphones, wearable technology, phablets, tablet computers, laptop computers, desktop computers, other computer servers or any other computer system known in the art, interconnected with client device 120, a plurality of endpoint 130-N, computing device 140, and server device 150 over network 110.

In embodiments of the present invention, client device 120, a plurality of endpoint 130-N, computing device 140, and server device 150 are connected to network 110, which enables client device 120, a plurality of endpoint 130-N, computing device 140, and server device 150 to access other computing devices and/or data not directly stored on client device 120, a plurality of endpoint 130-N, computing device 140, and server device 150 Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120, a plurality of endpoint 130-N, computing device 140, and server device 150, and any other computing devices (not shown in FIG. 1) connected to network 110, in accordance with embodiments of the present invention. In an embodiment, data received by another computing device (not shown in FIG. 1) in computing environment 100 is communicated to client device 120, a plurality of endpoint 130-N, computing device 140, and server device 150 via network 110.

In embodiments of the present invention, client device 120 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In certain embodiments, client device 120 represents a computer system utilizing clustered computers and components (e.g., database server computers, application server computers, etc.) that act as a single pool of seamless resources when accessed by elements of computing environment 100. In general, client device 120 is representative of any electronic device or combination of electronic devices capable of executing computer readable program instructions. In an embodiment, computing environment 100 includes any number of client device 120. Client device 120 includes components as depicted and described in further detail with respect to FIG. 3, in accordance with embodiments of the present invention. Client device 120 also includes user interface (UI) 122.

In an embodiment, user interface 122 provides an interface between a user of client device 120 and endpoint 130-N, computing device 140, and server device 150. User interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 may also be mobile application software that provides an interface between a user of client device 120 and endpoint 130-N, computing device 140, and server device 150. Mobile application software, or an "app," is a computer program designed to run on smart phones, tablet computers and other mobile devices. User interface 122 enables a user of client device 120 to receive vulnerability information from computing device 140 and send (i.e., transmit) said vulnerability information to endpoint 130-N.

According to embodiments of the present invention, endpoint 130-N may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In another embodiment, endpoint 130-N is a virtualized computer capable of communicating with any other computing device within computing environment 100. In certain embodiments, endpoint 130-N represents a computer system utilizing clustered computers and components (e.g., database server computers, application server computers, etc.) that act as a single pool of seamless resources when accessed by elements of computing environment 100. In general, endpoint 130-N is representative of any electronic device or combination of electronic devices capable of executing computer readable program instructions. In an embodiment, computing environment 100 includes any number of endpoint 130-N. Endpoint 130-N includes components as depicted and described in further detail with respect to FIG. 3, in accordance with embodiments of the present invention. Endpoint 130-N also includes a user interface (UI), not shown in FIG. 1 and management agent 132-1.

According to an embodiment of the present invention, management agent 132-1 may be a program, a subprogram of a larger program, an application, a plurality of applications, or mobile application software, which functions to interact with endpoint 130-1. In an embodiment, management agent 132-1 is equivalent to management agent 132-2 (not shown in FIG. 1) on endpoint 130-2 and management agent 132-N (not shown in FIG. 1) on endpoint 130-N. In this paper, discussion regarding management agent 132-N is applicable to management agent 132-1, management agent 132-2, and any other instance of the management agent. In an embodiment, management agent 132-N collects information about endpoint 130-N such as the status of endpoint 130-N (e.g., operating system, processors, memory, etc.) and information about software (not shown in FIG. 1) such as the applications found on endpoint 130-N. In the embodiment, management agent 132-N transmits the information collected about endpoint 130-N to server device 150. Further in the embodiment, management agent 132-N can quarantine endpoint 130-N upon endpoint 130-N reconnecting with network 110 so that endpoint 130-N can only communicate with server device 150 until vulnerability actions are carried out on endpoint 130-N.

In embodiments of the present invention, computing device 140 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In certain embodiments, computing device 140 represents a computer system utilizing clustered computers and components (e.g., database server computers, application server computers, etc.) that act as a single pool of seamless resources when accessed by elements of computing environment 100. In general, computing device 140 is representative of any electronic device or combination of electronic devices capable of executing computer readable program instructions. In an embodiment, computing environment 100 includes any number of computing device 140. Computing device 140 includes components as depicted and described in further detail with respect to FIG. 3, in accordance with embodiments of the present invention. Computing device 140 also includes a user interface (UI), not shown in FIG. 1 and database 142.

According to embodiments of the present invention, database 142 can be an organized collection of data stored on computing device 140 and accessed electronically by server device 150 over network 110. In an embodiment, data stored to database 142 includes, but is not limited to, continuously updated information about vulnerabilities of software programs, computer viruses and malware such as such as computer "worms", ransomware, spyware, adware, trojan horses, keyloggers, rootkits, bootkits, and other malicious software that can negatively impact the performance of endpoint 130-N. According to an embodiment, the information stored to database 142 is updated on a periodic basis (e.g., hourly, daily, weekly, monthly, etc.).

According to embodiments of the present invention, server device 150 may be a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. In certain embodiments, server device 150 represents a computer system utilizing clustered computers and components (e.g., database server computers, application server computers, etc.) that act as a single pool of seamless resources when accessed by elements of computing environment 100. In general, server device 150 is representative of any electronic device or combination of electronic devices capable of executing computer readable program instructions. In an embodiment, computing environment 100 includes any number of computing device 150. Server device 150 includes components as depicted and described in further detail with respect to FIG. 3, in accordance with embodiments of the present invention. Server device 150 also includes a user interface (UI), not shown in FIG. 1, and vulnerability prediction engine 160, vulnerability configuration policy engine 170, memory 180, and endpoint vulnerability management program 190.

In an embodiment, vulnerability prediction engine (VPE) 160 uses the information stored to database 142 on computing device 140 to predict one or more vulnerabilities to which any disconnected endpoint 130-N is potentially vulnerable. In an embodiment, VPE 160 identifies a timeline of when vulnerabilities are discovered and creates a list of the new vulnerabilities. In an embodiment, VPE 160 uses the latest information about endpoint 130-N, provided by management agent 132-N, to determine what vulnerabilities are currently known to endpoint 130-N (i.e., known vulnerabilities). VPE 160 then compares the known vulnerabilities to the new vulnerabilities to predict the one or more vulnerabilities to which a disconnected endpoint 130-N is potentially vulnerable.

According to embodiments of the present invention, vulnerability configuration policy engine (VCPE) 170 determines which of the one or more vulnerabilities, predicted by VPE 160, warrants preventive action when a disconnected endpoint reconnects with the network as well as determining associated policies to be carried out when the disconnected endpoint reconnects with the network. In an embodiment, the preventive actions can include, but are not limited to, updating a program, disabling an application, and suggesting that the endpoint be quarantined. In an embodiment, the determined one or more preventive actions are determined, at least in part, by the information available (e.g., the severity of being impacted by the vulnerability, the number of available exploits, etc.) for the predicted one or more vulnerabilities as well as by customization performed by a user such as an administrator. According to an embodiment of the present invention, VCPE 170 stores the determined one or more vulnerabilities requiring preventive action to prevention policies 186 and prevention action 188 in memory 180 on server device 150.

In an embodiment, memory 180 is storage that can be written to and/or read by VCPE 170, and any other programs and applications on server device 150. In one embodiment, memory 180 resides on server device 150. In other embodiments, memory 180 may reside on client device 120, endpoint 130-N, computing device 140, or any other device (not shown) in computing environment 100, in cloud storage or on another computing device accessible via network 110. In yet another embodiment, memory 180 may represent multiple storage devices within server device 150. Memory 180 may be implemented using any volatile or non-volatile storage media for storing information, as known in the art. For example, memory 180 may be implemented with a tape library, optical library, one or more independent hard disk drives, multiple hard disk drives in a redundant array of independent disks (RAID), solid-state drives (SSD), or random-access memory (RAM). Similarly, memory 180 may be implemented with any suitable storage architecture known in the art, such as a relational database, an object-oriented database, or one or more tables. In an embodiment of the present invention, VCPE 170, and any other programs and applications (not shown in FIG. 1) operating on server device 150 may store, read, modify, or write data to memory 180. In an embodiment of the present invention, data stored to memory 180 includes, but is not limited to, endpoint status 182, vulnerable endpoints 184, prevention policies 185, and prevention actions 188.

According to embodiments of the present invention, endpoint status 182 is a memory location for storing the status of endpoint 130-N. In an embodiment, the status includes, but is not limited to, the hardware status of endpoint 130-N (e.g., the processing capability, the amount of memory in use, the amount of available memory, etc.), the software status of endpoint 130-N (e.g., the operating system, the software installed, the versions of the installed software, the software patches (i.e., fixes) installed, the configuration, the enabled features, etc.), and the connection status of endpoint 130-N.

In an embodiment, vulnerable endpoints 184 is a memory location for storing the names of the endpoint 130-N that have been determined to be vulnerable. According to an embodiment of the present invention, endpoint 130-N is determined to be vulnerable when endpoint 130-N has not reported to, via management agent 132-N, server device 150 within a time-frame. In an embodiment, the time-frame may be fixed (e.g., eight hours). In another embodiment, the time-frame may be variable (e.g., eight hours Monday through Friday, twenty-four hours Saturday and Sunday). In an embodiment, the time-frame may be determined by a user (e.g., a system administrator). In another embodiment, the time-frame may be determined by a program (e.g., VPE 160).

According to an embodiment, prevention policies 186 is a memory location for storing the determined policies for non-reporting endpoint 130-N, as determined by VCPE 170. In an embodiment, the prevention policies include, but are not limited to, identifying that endpoint 130-N requires quarantine to protect the computing devices connected to network 110 from predicted vulnerabilities not yet addressed but believed to be present on endpoint 130-N. In the embodiment, other determined policies include an instruction to enable endpoint 130-N to only connect to a remediation network (not shown in FIG. 1) until the predicted vulnerability has been resolved and the type of resolution for the predicted vulnerability (e.g., automated remediation, software patch, software reconfiguration, manual remediation by an operator, and the like).

In an embodiment, prevention actions 188 is a memory location for storing the determined prevention actions for non-reporting endpoint 130-N, as determined by VCPE 170. According to an embodiment, prevention actions stored to prevention actions 188 include, but are not limited to, update the vulnerable software, remove the vulnerable software, disable the vulnerable software, install a patch for the vulnerable software, a time-frame for performing the prevention action, and the like.

In an embodiment, endpoint vulnerability management program (EVMP) 190 may be a program, a subprogram of a larger program, an application, a plurality of applications, or mobile application software, which functions to provide predictive vulnerability management of disconnected endpoints in enterprise systems. A program is a sequence of instructions written by a programmer to perform a specific task. In an embodiment, EVMP 190 runs by itself. In other embodiments, EVMP 190 depends on system software (not shown in FIG. 1) to execute. In one embodiment, EVMP 190 functions as a stand-alone program residing on server device 150. In another embodiment, EVMP 190 works in conjunction with other programs, applications, etc., found in computing environment 100. In yet another embodiment, EVMP 190 is found on client device 120, endpoint 130-N or computing device 140. In yet another embodiment, EVMP 190 is found on other computing devices (not shown in FIG. 1) in computing environment 100, which are interconnected to computing device 150 via network 110.

In an embodiment, EVMP 190 queries the endpoint associated with EVMP 190. EVMP 190 then determines which of the associated endpoints are connected to the network. For the endpoints not connected, EVMP 190 determines their latest status and sends (i.e., transmits) said latest status to VPE 160. Vulnerabilities that can negatively affect the disconnected endpoints are predicted by VPE 160 and sent by EVMP 190 to VCPE 170. Policies and actions to mitigate the predicted vulnerabilities are determined by VCPE 170, retrieved by EVMP 190, and sent to management agent 132-N to be carried out, thus protecting a disconnected endpoint 130-N when it reconnects to the network.

Figure 2:
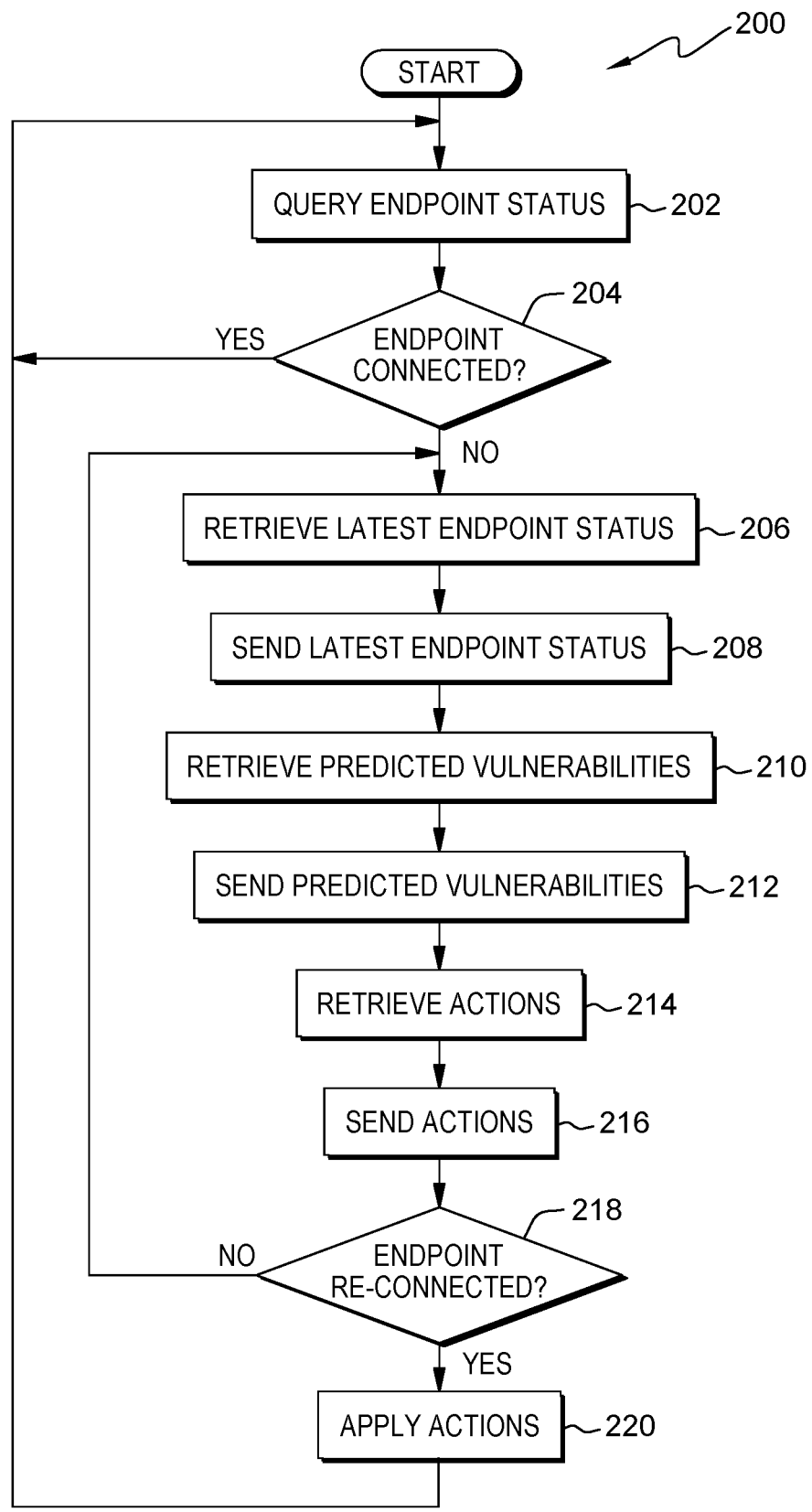
FIG. 2 depicts a flowchart of a program for providing predictive vulnerability management of disconnected endpoints in enterprise systems, in accordance with an embodiment of the present invention.

FIG. 2 is a flowchart of workflow 200 depicting a method for providing predictive vulnerability management of disconnected endpoints in enterprise systems. In one embodiment, the method of workflow 200 is performed by endpoint vulnerability management program (EVMP) 190. In an alternative embodiment, the method of workflow 200 is performed by any other program working with EVMP 190. In an embodiment, a user, via user interface 122, invokes workflow 200 upon installing a new endpoint 130-N. In an alternative embodiment, a user invokes workflow 200 upon accessing EVMP 190 on client device 120 via network 110.

In an embodiment, EVMP 190 queries endpoint status (step 202). In other words, EVMP 190 determines the status of each endpoint associated with EVMP 190 in a computing environment. According to embodiments of the present invention, status items for each endpoint include, but are not limited to, identifying the installed software on the endpoint, the version of said software, the patches that have been applied to said software, the enabled features of said software, and the configuration of the endpoint from both the hardware and software perspective. In an embodiment, the query is performed on a basis determined by a user. In another embodiment, the query is performed on a basis determined by EVMP 190. In yet another embodiment, the query is performed on a basis determined by both a user and EVMP 190. In an embodiment, the queried status is stored to a specific memory location for later use. According to an embodiment of the present invention, EVMP 190 queries the status of endpoint 130-N and stores the queried status to location endpoint status 182 in memory 180 on server device 150. For example, a program queries the status of endpoint-1 (EP-1), EP-2, EP-3, EP-4, and EP-5 and stores the queried status of each endpoint to a memory.

In an embodiment, EVMP 190 determines whether an endpoint is connected (decision step 204). In other words, EVMP 190 determines whether each of endpoint 130-N is connected to network 110 (and therefore, connected to EVMP 190). According to an embodiment of the present invention, an endpoint determined to be disconnected from the network is identified as "vulnerable" as it may not have the latest software patches installed; in the embodiment, the names of any vulnerable endpoints are stored to vulnerable endpoints 184 in memory 180 on server device 150 so that the vulnerable endpoints can be identified by any authorized user. In one embodiment (decision step 204, YES branch), EVMP 190 determines that each of endpoint 130-N is connected to network 110; therefore, EVMP 190 returns to step 202 to query the status of each endpoint 130-N. In the embodiment (decision step 204, NO branch), EVMP 190 determines that one or more of endpoint 130-N is not connected to network 110; therefore, EVMP 190 proceeds to step 206.

In an embodiment, EVMP 190 retrieves latest endpoint status (step 206). In other words, responsive to determining that one or more of endpoint 130-N is not connected to network 110, EVMP 190 retrieves the results of the latest successful query for each of the disconnected endpoint 130-N. In an embodiment, the status of each disconnected endpoint 130-N are retrieved from a memory location in computing environment 100 which is accessible by EVMP 190. According to an embodiment of the present invention, EVMP 190 retrieves the latest status results from memory location endpoint status 182 in memory 180 on server device 150. For example, the program retrieves the status of EP-2 and EP-4, two endpoints determined to be disconnected from the network, from an accessible memory location.

In an embodiment, EVMP 190 sends latest endpoint status (step 208). In other words, EVMP 190 sends (i.e., transmits) the retrieved latest status for each of the disconnected endpoint 130-N to vulnerability prediction engine (VPE) 160 on server device 150. According to an embodiment of the present invention, VPE 160 uses the received latest status for each of the disconnected endpoint 130-N to predict one or more potential vulnerabilities that may negatively impact each disconnected endpoint 130-N. In an embodiment, the latest status of disconnected endpoint 130-N provides a reference for the current status of installed software, installed software patches, and the like, for each disconnected endpoint 130-N. In the embodiment, VPE 160 can retrieve current information about vulnerabilities of software programs, computer viruses, and malware which are stored to database 142 on computing device 140 and perform a comparison about said current information to the latest status of each disconnected endpoint 130-N. Based on the comparison, VPE 160 can generate a list of predicted vulnerabilities for each disconnected endpoint 130-N. In an embodiment, EVMP 190 transmits over network 110 the retrieved latest status for each disconnected endpoint 130-N to VPE 160 on server device 150 and VPE 160 generates a list of predicted vulnerabilities for each disconnected endpoint 130-N. For example, for the two disconnected endpoints, (i) the status of EP-2 shows that the software is at version "6.10", and (ii) the status of EP-4 shows that the software is at version "6.9" indicating a potential vulnerability of EP-4 to a virus.

In an embodiment, EVMP 190 retrieves predicted vulnerabilities (step 210). In other words, EVMP 190 retrieves the generated list, generated by VPE 160, of predicted vulnerabilities. In an embodiment, the generated list of predicted vulnerabilities is retrieved directly from VPE 160. In another embodiment, the generated list of predicted vulnerabilities is retrieved from a memory location in computing environment 100 which is accessible by EVMP 190. According to an embodiment of the present invention, EVMP 190 retrieves the generated list of predicted vulnerabilities from VPE 160. For example, the program retrieves the generated list of predicted vulnerabilities for EP-2 and EP-4, the two disconnected endpoints. In the example, there are no predicted vulnerabilities for EP-2 as software version "6.10" requires no patches to fix a virus intrusion point. However, because EP-4 is only at version "6.9", a predicted vulnerability for the virus "BUG" was generated based on EP-4 missing the patch "SQUASHBUG" (i.e., installing "SQUASHBUG" would change the software version from "6.9" to "6.10").

In an embodiment, EVMP 190 sends predicted vulnerabilities (step 212). In other words, EVMP 190 sends (i.e., transmits) the retrieved generated list of predicted vulnerabilities to vulnerability configuration policy engine (VCPE) 170 on server device 150. According to an embodiment of the present invention, VCPE 170 determines which of the one or more vulnerabilities from the generated list of predicted vulnerabilities created by VPE 160 warrants preventive action when a disconnected endpoint reconnects with the network. Further, VCPE 170 determines (i) the specific preventive actions to take for each disconnected endpoint to prevent the vulnerability from negatively impacting the endpoint and (ii) the policies required when implementing the specific preventive actions (e.g., the endpoint should be quarantined and connected to a remediation network and how to apply the preventive actions). According to an embodiment, the determined policies are stored to prevention policies 186 in memory 180 on server device 150 while the preventive actions are stored to prevention actions 188 in memory 180 on server device 150. In an embodiment, the determination of the specific prevention policies and actions is based, at least in part, on the information available to VCPE 170 (e.g., the severity of being impacted by the vulnerability, the number of available exploits, etc.) for the generated list of predicted vulnerabilities as well as by customization of the endpoint performed by a user such as a system administrator. According to an embodiment of the present invention, EVMP 190 transmits the retrieved generated list of predicted vulnerabilities over network 110 to VCPE 170 on server device 150. In response to receiving the transmitted list of predicted vulnerabilities, VCPE 170 determines the required preventive actions and associated policies for each disconnected endpoint 130-N. For example, no preventive action or policy is needed for EP-2 as the software on EP-2 is at the latest level. However, a preventive action to install the patch "SQUASHBUG" on EP-4 is determined by the program based on the software on EP-4 being down level. Further, the policy to quarantine EP-4 until the patch is installed is also determined by the program.

In an embodiment, EVMP 190 retrieves actions (step 214). In other words, EVMP 190 retrieves the preventive actions and policies for each disconnected endpoint as determined by VCPE 170. In an embodiment, the preventive actions/policies are retrieved directly from VCPE 170. In another embodiment, the preventive actions/policies are retrieved from a memory location (e.g., prevention actions 188) in computing environment 100 which is accessible by EVMP 190. According to an embodiment of the present invention, EVMP 190 retrieves the preventive actions and associated policies from VCPE 170 on server device 150. For example, the preventive action to install the "SQUASHBUG" patch on EP-4 is retrieved from a memory location.

In an embodiment, EVMP 190 sends actions (step 216). In other words, EVMP 190 sends (i.e., transmits) the retrieved preventive actions and associated policies to management agent 132-N for implementation on disconnected endpoint 130-N. In an embodiment, EVMP 190 sends the retrieved preventive actions and associated policies over network 110. According to an embodiment of the present invention, management agent 132-N will follow the policies sent by EVMP 190 (e.g., quarantine endpoint 130-N until the software vulnerability is resolved) and will implement the preventive actions (e.g., install the software patch) on the disconnected endpoint once the disconnected endpoint reconnects to the network). According to an embodiment of the present invention, EVMP 190 transmits the retrieved preventive actions and the associated policies using network 110 to management agent 132-N on endpoint 130-N. For example, the policy to quarantine EP-4 and the preventive action to install the patch "SQUASHBUG" on EP-4 is sent by the program to the management agent on EP-4.

In an embodiment, EVMP 190 determines whether the endpoint is reconnected (decision step 218). In other words, EVMP 190 determines whether the endpoint(s) previously determined to be disconnected from the network are now reconnected to the network. In one embodiment (decision step 218, NO branch), EVMP 190 determines that each of disconnected endpoint 130-N are not reconnected to network 110; therefore, EVMP 190 returns to step 206 to retrieve the status of each disconnected endpoint 130-N. In the embodiment (decision step 218, YES branch), EVMP 190 determines that one or more of disconnected endpoint 130-N is reconnected to network 110; therefore, EVMP 190 proceeds to step 220.

In an embodiment, EVMP 190 applies actions (step 220). In other words, responsive to determining that the disconnected endpoint is reconnected to the network, EVMP 190 directs a management agent to apply the received prevention policies and actions. Thus, by implementing (i.e., following) the policy to quarantine the reconnected endpoint, the balance of the computing environment is protected from the vulnerable endpoint until such time that the predicted vulnerability is resolved by carrying out the preventive action. According to an embodiment of the present invention, EVMP 190 directs management agent 132-N on endpoint 130-N to follow the received prevention policies and perform the received preventive actions. For example, the program directs the management agent on EP-4 to (i) quarantine EP-4 from the rest of the computing environment and to (ii) install the patch "SQUASHBUG" on EP-4 to resolve the predicted vulnerability "BUG". Once "SQUASHBUG" is installed by the program on EP-4, the program removes EP-4 from quarantine, and EP-4 returns to normal operation within the computing environment.

According to an additional embodiment of the present invention, the functionality of vulnerability prediction engine (VPE) 160 and vulnerability configuration policy engine (VCPE) 170 are performed by endpoint vulnerability management program (EVMP) 190 such that VPE 160 and VCPE 170 do not exist as discrete engines found on server device 150. In other words, EVMP 190 can (i) retrieve the latest endpoint status of each disconnected endpoint 130-N, (ii) use the received latest status for each of the disconnected endpoint 130-N to predict and generate a list of one or more potential vulnerabilities that may negatively impact each disconnected endpoint 130-N (this function previously performed by VPE 160), and (iii) determine which of the one or more vulnerabilities from the generated list of predicted vulnerabilities warrants preventive action when a disconnected endpoint 130-N reconnects with the network (this function previously performed by VCPE 170). In this additional embodiment, vulnerability management is further streamlined as one program is performing additional processing which eliminates various "sending", "transmitting", and "retrieving" steps in the process.

Figure 3:
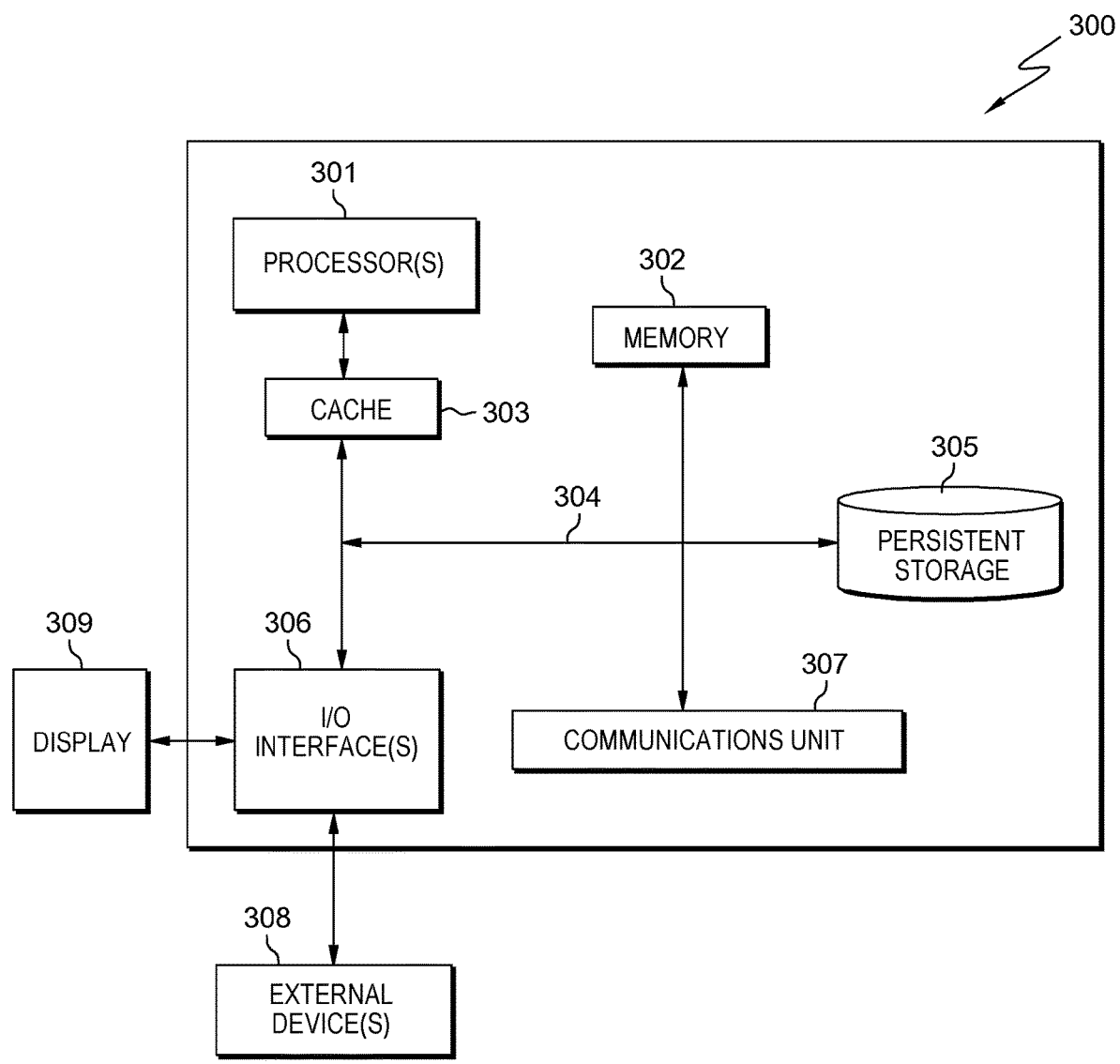
FIG. 3 depicts a block diagram of components of the computing environment of FIG. 1, in accordance with an embodiment of the present invention.

FIG. 3 depicts computer system 300, which is an example of a system that includes preemption program 136. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
responsive to determining that one or more endpoints in a plurality of endpoints is not connected to a network, retrieving, by one or more computer processors, a first latest status of the one or more disconnected endpoints from a memory, wherein the first latest status includes identified software installed on the one or more disconnected endpoints, one or more software patches applied to the identified software, and one or more enabled features of the identified software;
retrieving, by one or more computer processors, a set of predicted vulnerabilities for each of the one or more disconnected endpoints from the memory, wherein the set of predicted vulnerabilities is based on the first latest status of the one or more disconnected endpoints;
retrieving, by one or more computer processors, a set of preventive actions and policies associated with and based on the set of predicted vulnerabilities to be performed when each of the one or more disconnected endpoints reconnects to the network, wherein the set of preventive actions and policies are retrieved from the memory;
determining, by one or more computer processors, whether at least one endpoint in the one or more endpoints not connected to the network reconnects to the network; and
responsive to determining that at least one endpoint in the one or more endpoints not connected to the network is reconnected to the network, performing, by one or more computer processors, at least one preventive action from the set of preventive actions according to at least one policy from the set of policies on the at least one endpoint reconnected to the network.

2. The method of claim 1, wherein the step of retrieving, by one or more computer processors, a set of predicted vulnerabilities for each of the one or more disconnected endpoints from the memory, comprises:
transmitting, by one or more computer processors, the retrieved first latest status of each of the one or more disconnected endpoints to a vulnerability prediction engine, wherein:
the vulnerability prediction engine predicts a set of predicted vulnerabilities for each of the one or more disconnected endpoints and stores the set to the memory; and
the set of predicted vulnerabilities are based on continuously updated information about vulnerabilities of software programs, computer viruses and malware; and
retrieving, by one or more computer processors, the set of predicted vulnerabilities.

3. The method of claim 1, wherein the step of retrieving, by one or more computer processors, a set of preventive actions and policies associated with and based on the set of predicted vulnerabilities to be performed when each of the one or more disconnected endpoints reconnects to the network, comprises:
    sending, by one or more computer processors, the retrieved set of predicted vulnerabilities for each of the one or more disconnected endpoints to a vulnerability configuration policy engine, wherein:
        the vulnerability configuration policy engine determines policies, associated with the set of predicted vulnerabilities, to be followed when the disconnected endpoint reconnects with the network; and
        the set of preventive actions and policies to be followed are stored to the memory; and
    retrieving, by one or more computer processors, the set of preventive actions and policies associated with and based on the set of predicted vulnerabilities to be performed when each of the one or more disconnected endpoints reconnects to the network.

4. The method of claim 1, wherein the step of performing, by one or more computer processors, at least one preventive action from the set of preventive actions according to at least one policy from the set of policies on the at least one endpoint reconnected to the network, comprises:
    transmitting, by one or more computer processors, the retrieved set of preventive actions and policies associated with and based on the set of predicted vulnerabilities to the at least one endpoint reconnected to the network to a management agent included on the at least one endpoint, wherein the management agent performs the at least one preventive action from the set of preventive actions according to at least one policy from the set of policies on the at least one endpoint.

5. The method of claim 1, further comprising:
    responsive to determining that at least one endpoint in the one or more endpoints not connected to the network has not reconnected to the network, retrieving, by one or more computer processors, a second latest status or the at least one endpoint.

6. The method of claim 1, wherein the set of preventive actions are selected from the group consisting of updating a vulnerable software program, removing the vulnerable software program, disabling the vulnerable software program, installing a patch for the vulnerable software program, and a time-frame for performing the set of prevention actions.

7. The method of claim 1, wherein policies associated with the set of preventive actions are selected from the group consisting of a first policy that requires quarantining of the disconnected endpoint upon reconnection to the network, a second policy that requires the disconnected endpoint to only connect to a remediation network upon reconnection to the network, and a third policy defining a type of resolution for each vulnerability in the set of predicted vulnerabilities.

8. A computer program product, the computer program product comprising:
    one or more computer readable storage media; and
    program instructions stored on the one or more computer readable storage media, the program instructions comprising:
        responsive to determining that one or more endpoints in a plurality of endpoints is not connected to a network, retrieving, by one or more computer processors, a first latest status of the one or more disconnected endpoints from a memory, wherein the first latest status includes identified software installed on the one or more disconnected endpoints, one or more software patches applied to the identified software, and one or more enabled features of the identified software;
    program instructions to retrieve a set of predicted vulnerabilities for each of the one or more disconnected endpoints from the memory, wherein the set of predicted vulnerabilities is based on the first latest status of the one or more disconnected endpoints;
    program instructions to retrieve a set of preventive actions and policies associated with and based on the set of predicted vulnerabilities to be performed when each of the one or more disconnected endpoints reconnects to the network, wherein the set of preventive actions and policies are retrieved from the memory;
    program instructions to determine whether at least one endpoint in the one or more endpoints not connected to the network reconnects to the network; and
    responsive to determining that at least one endpoint in the one or more endpoints not connected to the network is reconnected to the network, program instructions to perform at least one preventive action from the set of preventive actions according to at least one policy from the set of policies on the at least one endpoint reconnected to the network.

9. The computer program product of claim 8, wherein the program instructions to retrieve a set of predicted vulnerabilities for each of the one or more disconnected endpoints from the memory, comprises:
    program instructions to transmit the retrieved first latest status of each of the one or more disconnected endpoints to a vulnerability prediction engine, wherein:
        the vulnerability prediction engine predicts a set of predicted vulnerabilities for each of the one or more disconnected endpoints and stores the set to the memory; and
        the set of predicted vulnerabilities are based on continuously updated information about vulnerabilities of software programs, computer viruses and malware; and
    program instructions to retrieve the set of predicted vulnerabilities.

10. The computer program product of claim 8, wherein the program instructions to retrieve a set of preventive actions and policies associated with and based on the set of predicted vulnerabilities to be performed when each of the one or more disconnected endpoints reconnects to the network, comprises:
    program instructions to send the retrieved set of predicted vulnerabilities for each of the one or more disconnected endpoints to a vulnerability configuration policy engine, wherein:
        the vulnerability configuration policy engine determines policies, associated with the set of predicted vulnerabilities, to be followed when the disconnected endpoint reconnects with the network; and
        the set of preventive actions and policies to be followed are stored to the memory; and
    program instructions to retrieve the set of preventive actions and policies associated with and based on the set of predicted vulnerabilities to be performed when each of the one or more disconnected endpoints reconnects to the network.

11. The computer program product of claim 8, wherein the program instructions to perform at least one preventive action from the set of preventive actions according to at least one policy from the set of policies on the at least one endpoint reconnected to the network, comprises:
program instructions to transmit the retrieved set of preventive actions and policies associated with and based on the set of predicted vulnerabilities to the at least one endpoint reconnected to the network to a management agent included on the at least one endpoint, wherein the management agent performs the at least one preventive action from the set of preventive actions according to at least one policy from the set of policies on the at least one endpoint.

12. The computer program product of claim 8, further comprising program instructions stored on the one or more computer readable media, to:
responsive to determining that at least one endpoint in the one or more endpoints not connected to the network has not reconnected to the network, retrieve a second latest status of the at least one endpoint.

13. The computer program product of claim 8, wherein the set of preventive actions are selected from the group consisting of updating a vulnerable software program, removing the vulnerable software program, disabling the vulnerable software program, installing a patch for the vulnerable software program, and a time-frame for performing the set of prevention actions.

14. The computer program product of claim 8, wherein policies associated with the set of preventive actions are selected from the group consisting of a first policy that requires quarantining of the disconnected endpoint upon reconnection to the network, a second policy that requires the disconnected endpoint to only connect to a remediation network upon reconnection to the network, and a third policy defining a type of resolution for each vulnerability in the set of predicted vulnerabilities.

15. A computer system, the computer system comprising:
one or more computer processors;
one or more computer readable storage media; and
program instructions stored on the one or more computer readable storage media for execution by the one or more computer processors, the program instructions comprising:
responsive to determining that one or more endpoints in a plurality of endpoints is not connected to a network, retrieving, by one or more computer processors, a first latest status of the one or more disconnected endpoints from a memory, wherein the first latest status includes identified software installed on the one or more disconnected endpoints, one or more software patches applied to the identified software, and one or more enabled features of the identified software;
program instructions to retrieve a set of predicted vulnerabilities for each of the one or more disconnected endpoints from the memory, wherein the set of predicted vulnerabilities is based on the first latest status of the one or more disconnected endpoints;
program instructions to retrieve a set of preventive actions and policies associated with and based on the set of predicted vulnerabilities to be performed when each of the one or more disconnected endpoints reconnects to the network, wherein the set of preventive actions and policies are retrieved from the memory;
program instructions to determine whether at least one endpoint in the one or more endpoints not connected to the network reconnects to the network; and
responsive to determining that at least one endpoint in the one or more endpoints not connected to the network is reconnected to the network, program instructions to perform at least one preventive action from the set of preventive actions according to at least one policy from the set of policies on the at least one endpoint reconnected to the network.

16. The computer system of claim 15, wherein the program instructions to retrieve a set of predicted vulnerabilities for each of the one or more disconnected endpoints from the memory, comprises:
program instructions to transmit the retrieved first latest status of each of the one or more disconnected endpoints to a vulnerability prediction engine, wherein:
the vulnerability prediction engine predicts a set of predicted vulnerabilities for each of the one or more disconnected endpoints and stores the set to the memory; and
the set of predicted vulnerabilities are based on continuously updated information about vulnerabilities of software programs, computer viruses and malware; and
program instructions to retrieve the set of predicted vulnerabilities.

17. The computer system of claim 15, wherein the program instructions to retrieve a set of preventive actions and policies associated with and based on the set of predicted vulnerabilities to be performed when each of the one or more disconnected endpoints reconnects to the network, comprises:
program instructions to send the retrieved set of predicted vulnerabilities for each of the one or more disconnected endpoints to a vulnerability configuration policy engine, wherein:
the vulnerability configuration policy engine determines policies, associated with the set of predicted vulnerabilities, to be followed when the disconnected endpoint reconnects with the network; and
the set of preventive actions and policies to be followed are stored to the memory; and
program instructions to retrieve the set of preventive actions and policies associated with and based on the set of predicted vulnerabilities to be performed when each of the one or more disconnected endpoints reconnects to the network.

18. The computer system of claim 15, wherein the program instructions to perform at least one preventive action from the set of preventive actions according to at least one policy from the set of policies on the at least one endpoint reconnected to the network, comprises:
program instructions to transmit the retrieved set of preventive actions and policies associated with and based on the set of predicted vulnerabilities to the at least one endpoint reconnected to the network to a management agent included on the at least one endpoint, wherein the management agent performs the at least one preventive action from the set of preventive actions according to at least one policy from the set of policies on the at least one endpoint.

19. The computer system of claim 15, further comprising program instructions stored on the one or more computer readable media, to:
responsive to determining that at least one endpoint in the one or more endpoints not connected to the network has not reconnected to the network, retrieve a second latest status of the at least one endpoint.

20. The computer system of claim 15, wherein the set of preventive actions are selected from the group consisting of updating a vulnerable software program, removing the vulnerable software program, disabling the vulnerable software program, installing a patch for the vulnerable software program, and a time-frame for performing the set of prevention actions.

* * * * *